US012564910B2

(12) United States Patent
Hogan et al.

(10) Patent No.: US 12,564,910 B2
(45) Date of Patent: Mar. 3, 2026

(54) SYSTEM AND METHOD FOR COLLABORATIVE LINEAR MOTOR CONVEYOR OPERATION

(71) Applicant: ATS Corporation, Cambridge (CA)

(72) Inventors: Roger Hogan, Cambridge (CA); Blake Robert Lambert, Cambridge (CA); Robert John Symmes, Cambridge (CA)

( * ) Notice: Subject to any disclaimer, the term of this patent is extended or adjusted under 35 U.S.C. 154(b) by 102 days.

(21) Appl. No.: 18/465,238

(22) Filed: Sep. 12, 2023

(65) Prior Publication Data

US 2024/0082971 A1      Mar. 14, 2024

Related U.S. Application Data

(60) Provisional application No. 63/405,612, filed on Sep. 12, 2022.

(30) Foreign Application Priority Data

Sep. 11, 2023    (EP) .................................... 23196674

(51) Int. Cl.
B23Q 7/14          (2006.01)
B23Q 5/58          (2006.01)
(Continued)

(52) U.S. Cl.
CPC ............. B23Q 7/1447 (2013.01); B23Q 5/58 (2013.01); B65G 43/08 (2013.01); B65G 54/02 (2013.01); H02K 41/031 (2013.01)

(58) Field of Classification Search
CPC ...... B65G 54/02; B65G 43/08; B23Q 7/1447; B23Q 5/58; H02K 41/031; H02K 41/03
(Continued)

(56) References Cited

U.S. PATENT DOCUMENTS 11,745,961 B2 * 9/2023 Cameron ........... B65G 21/2054
                                                           198/805
2021/0284462 A1 * 9/2021 Royce ..................... B60L 13/03
(Continued)

FOREIGN PATENT DOCUMENTS

DE        102016107564 A1 * 10/2017    ......... G05B 19/4185
JP           2017178490 A    10/2017
WO         2020260566 A1    12/2020

OTHER PUBLICATIONS

Partial European Search Report, European Patent Office, on corresponding EP Application No. 23196674.8 dated Apr. 2, 2024.

*Primary Examiner* — James R Bidwell
(74) *Attorney, Agent, or Firm* — Amarok IP Inc.; Neil W. Henderson

(57)          ABSTRACT

A system and method for collaborative manufacturing system operation for a linear motor conveyor system including one or more moving elements. The system includes: at least two safety gates arranged on the linear motor conveyor system creating a collaborative area between the safety gates. Each safety gate includes: a body; two doors, one on each side of the body; an interlock connecting the two doors such that only one door can remain open at a time; and a control system to control the safety gates in coordination with the linear motor conveyor system. The method includes: configuring an operating status, which may be non-collaborative, collaborative, or semi-collaborative modes; monitoring a safety trigger and, if activated, performing a safety action and controlling according to the type of safety trigger; monitoring if the safety trigger is removed; and if the safety trigger is removed, return to operating in the configured mode.

15 Claims, 18 Drawing Sheets

(51) Int. Cl.
 B65G 43/08   (2006.01)
 B65G 54/02   (2006.01)
 H02K 41/03   (2006.01)

(58) Field of Classification Search
 USPC ............................................. 198/502.1, 805
 See application file for complete search history.

(56)      References Cited

U.S. PATENT DOCUMENTS

2022/0404794 A1 * 12/2022 Pritchard ............... B25J 9/1694
2023/0079622 A1 * 3/2023 Choumach .............. H02K 5/00
                310/12.01

* cited by examiner

SYSTEM AND METHOD FOR COLLABORATIVE LINEAR MOTOR CONVEYOR OPERATION

RELATED APPLICATIONS

This application claims priority from U.S. Provisional App. No. 63/405,612, filed Sep. 12, 2022, which is hereby incorporated herein by reference.

FIELD

The present disclosure relates generally to a system and method for collaborative linear motor conveyor operation and, more particularly, a system and method for controlling or managing human interaction with a manufacturing system including a linear motor conveyor and related manufacturing stations.

BACKGROUND

In a manufacturing environment, there are typically many machines operating to move, manipulate, process or otherwise deal with raw materials and parts. These machines are generally driven by various motors (often electric) that may include linear or rotary servo motors. Examples of machines that make use of electric motors include conveyor systems and robotic systems. These machines can typically conduct operations at forces, speeds or accelerations that may pose a safety risk to humans (operators, inspectors and the like) or objects that may be in or move into the vicinity of the machines. As such, machines that pose a safety risk are generally protected by guard fencing or the like and various types of safety measures such as "dead-man" switches, interlocks, or the like that cause the machine to stop when a human may be at risk.

As one example, linear motor conveyor systems have become more popular. These conveyors include a moving element that is controlled to move along a track by electromotive force. In some cases, the moving element includes a permanent magnet and the track includes an electromagnetic field generator. The moving element is placed on the track such that the magnets are acted on by the electromagnetic field in order to move the moving element along the track.

In linear motor conveyor systems, forces on the moving element can be high in order to move the moving element quickly (both acceleration and speed) in order to increase production speeds. Due to the fast acceleration and speed of travel of the moving elements, there are traditionally substantial safeguards put in place to protect nearby humans and objects. Generally, these conveyor systems are fully enclosed and may include access openings that would typically be required to be latched or locked during production. As the moving element operates at high speeds, accessing the conveyor system, for example in order to provide maintenance or repairs, generally requires the conveyor to be stopped in order to reduce the likelihood of an operator being injured by a moving element, or other moving part. As such, in conventional systems, it can be difficult to complete repairs or maintenance without significant down time for the conveyor system. In a similar way, robots or other machines operating at high accelerations and high speeds in conjunction with the conveyor system may also require safety conditions or safeguards that will typically require the machine to stop when human operators are present.

Because of this need to stop the overall manufacturing system, it can be difficult to address even smaller issues, for example maintenance for a small area of a linear conveyor system, when the operator is required to shut down a significant area or the whole conveyor system in order to provide a safe working environment.

It is therefore desirable to provide a system and method for controlling or managing human interaction with a linear motor conveyor that overcomes at least one problem with conventional systems.

SUMMARY

According to one aspect herein, there is provided a system for collaborative manufacturing system operation for a linear motor conveyor system including one or more moving elements, the system including: at least two safety gates arranged on the linear motor conveyor system to provide a collaborative area between the safety gates, each safety gate including: a body; two doors, one on each side of the body; an interlock connecting the two doors and configured such that only one door can remain open at a time; and a control system to control operation of the safety gates in coordination with the operation of the linear motor conveyor system.

In some cases, the system may further include: a power reduction circuit provided to the linear motor conveyor system in the collaborative area, wherein the power reduction circuit limits the power provided to the linear motor conveyor in the collaborative area. In this case, the control system may be configured to monitor the power reduction circuit and control the interlock to prevent either of the two doors on each safety gate from opening if the power reduction circuit fails.

In some cases, the system may further include: a sensor for detecting if a human is present in the collaborative area; and a safety relay, connected with the sensor, configured to lock both the safety gates open when a human is not present in the collaborative area.

In some cases, the two doors may be configured to conform to the shape of the one or more moving elements and payload thereon.

In some cases, the interlock may be a mechanical interlock configured such that an opening of one of the two doors, closes the other door.

In some cases, the interlock may be configured such that one of the two doors cannot open until the other door is fully closed.

According to another aspect herein, there is provided a method for controlling a collaborative manufacturing system, the method including: configuring an operating status of each area of the manufacturing system, wherein the operating status of each area may include one of non-collaborative, collaborative, semi-collaborative modes; operating the manufacturing system; monitoring for a safety trigger and, if a safety trigger is activated, performing a safety action and controlling the manufacturing system according to the type of safety trigger; monitoring if the safety trigger is removed or ended; and if the safety trigger is removed, the control system returns to operating in the configured mode.

In some cases, the safety trigger may include at least one of: a safety alarm or a scheduled maintenance. In this case, the safety alarm may include at least one of: a door opening on an enclosure around the non-collaborative area, an operator-presence sensor being activated in a semi-collaborative area, failure of a safety measure in a collaborative area.

In some cases, the safety action may include at least one of: stopping operation of the manufacturing system, setting the entire manufacturing system to operate in the collaborative mode, setting a semi-collaborative area to operate in the collaborative mode, setting a non-collaborative area to operate in the collaborative mode.

In some cases, the semi-collaborative mode is set to operate the same as a non-collaborative mode until a safety trigger is activated and the semi-collaborative mode then operates in collaborative mode.

According to another aspect herein, there is provided a system for collaborative manufacturing system operation for a linear motor conveyor system including one or more moving elements, the system including: a rotating table placed adjacent to the linear motor conveyor system, wherein the rotating table may include an enclosed side near the linear motor conveyor system, and an accessible side opposite the enclosed side; an actuator to move a part from the one or more moving elements to the rotating table or from the rotating table to the one or more moving elements; and a motor to rotate the table such that the part moves from the enclosed side to the accessible side and, after action on the part, moves the part from the accessible side to the enclosed side.

In some cases, the system may further include a safety system 1030 for detecting if an operator enters a predetermined area at the accessible side of the rotating table.

In some cases, the rotating table may be configured to be large enough that an operator cannot reach to the enclosed side.

Other aspects and features of the present disclosure will become apparent to those ordinarily skilled in the art upon review of the following description of specific embodiments in conjunction with the accompanying figures.

BRIEF DESCRIPTION OF THE FIGURES

Embodiments of the present disclosure will now be described, by way of example only, with reference to the attached Figures.

DETAILED DESCRIPTION

Generally, the present disclosure relates to a system and method for controlling or managing human interaction with a manufacturing system including a linear motor conveyor. Embodiments herein are intended to provide protection to human operators when in an environment around a linear motor conveyor (sometimes called a "collaborative area" or "semi-collaborative area"). Generally speaking, safety organizations require that, for collaborative functional safety between human and machine, a human must not be able to enter into or reach beyond an area that has a combination of safe low force and safe low speed. The actual requirements will vary depending on the application and safety regulations, but these are generally the variables that are considered.

In some cases, embodiments of the system and method provide for the use of gates between collaborative and non-collaborative areas of a manufacturing system. In these manufacturing systems, it is intended that moving elements can continue to travel on the linear motor conveyor system in the collaborative section, but with reduced force and/or momentum (associated with a reduced acceleration and/or speed) to ensure that a human in the vicinity will not be injured.

Figure 1:
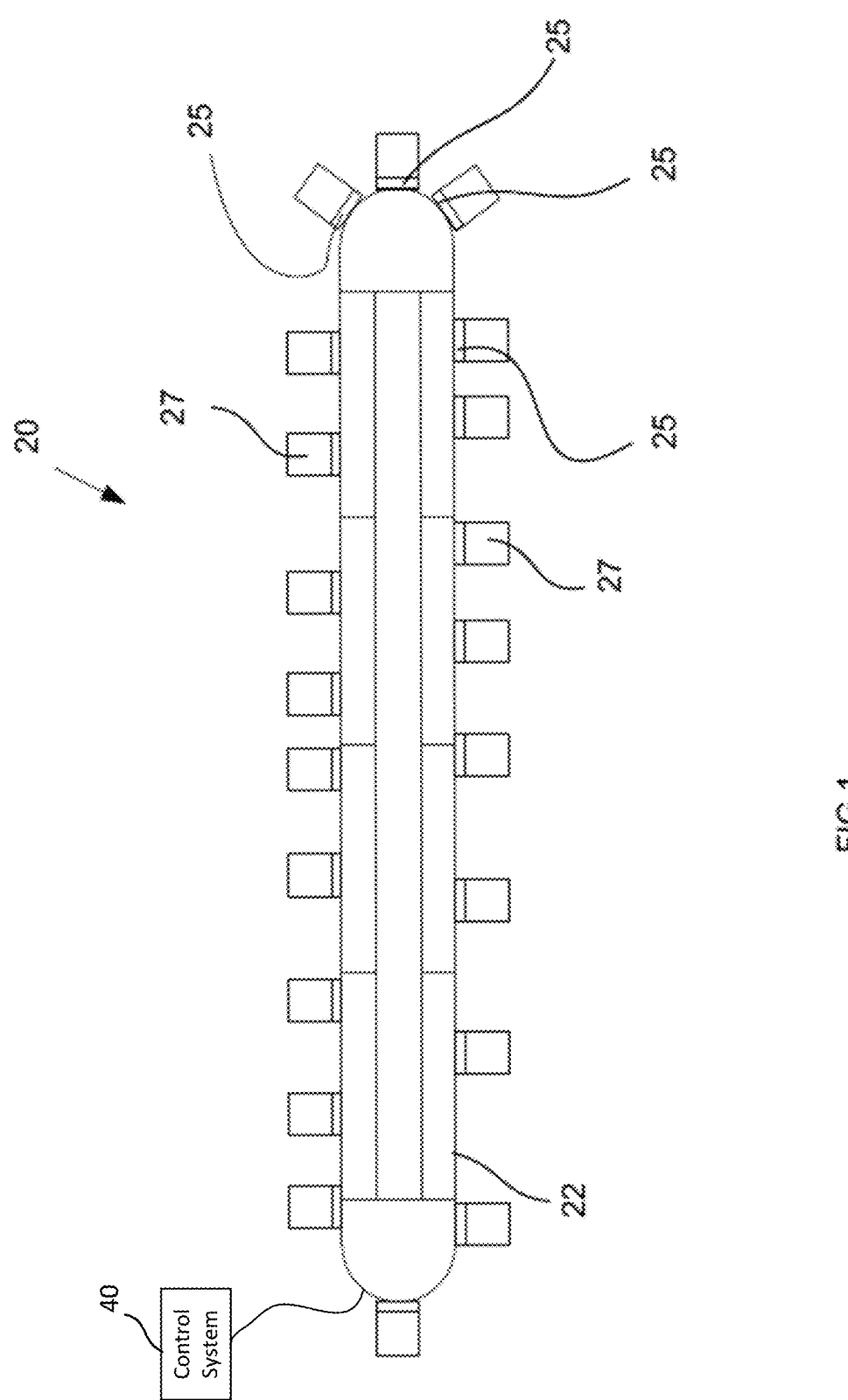
FIG. 1 illustrates a linear motor conveyor system according to an embodiment.

FIG. 1 shows a general schematic diagram of a linear motor conveyor system 20, with which embodiments of the system and method herein may be used. As shown in FIG. 1, the example linear motor conveyor system 20 includes a track 22 and a plurality of moving elements 25 distributed on the track 22. As a linear motor conveyor, the track includes a plurality of motor coils (not shown), which interact with at least one magnet (not shown) provided to the moving elements 25 to drive the moving element 25 along the track 22. While the moving element 25 may carry a product/part directly, the moving element 25 may also include or be attached to a pallet or an additional tooling plate 27, which may include, for example, one or more nests to hold the part or product in place on the pallet 27. The pallet 27 or a part/product thereon can be operated on automatically by, for example, a robot (not shown), while moving or at a workstation. Through the operation of the linear motor conveyor, various operations can be performed to provide for the creation or assembly of a product. In some cases, the moving element 25 and pallet/tooling plate 27 may be fixed together. In this disclosure, the terms "moving element" and "pallet" may sometimes be used interchangeably, depending on the context.

The linear motor conveyor system 20 includes a control system 40 for controlling the operation of the linear motor conveyor system 20. In some cases, the control system 40 may include a plurality of track section controllers (not shown) that control each track section or a plurality of track sections or an area of the linear motor conveyor system.

As discussed above, for more efficient manufacturing, a manufacturing system including a linear motor conveyor is generally configured to allow the moving elements to be moved from workstation to workstation at a high speed and/or acceleration, and related significant momentum and/or force. As such, safety concerns may require that the manufacturing system be operated in an enclosed space in order to avoid contact with human operators. In this case, the conveyor system may be accessed via various doors or entryways that can be locked when the conveyor system is in motion. Conventional manufacturing systems often include safety relays or other safety mechanisms that may trigger due to various situations. For example, if a door of the enclosure is opened, the manufacturing system will stop to ensure that an operator is not injured by moving parts of the system. Once the system has stopped, the operator can access the mechanical devices, electrical devices, wiring, pneumatics, hydraulics and the like, in order to repair or provide maintenance to the manufacturing system, access a pallet or part being handled by the conveyor system or the like. Typically, either the complete manufacturing system is stopped, or at least the entire location where the maintenance or service is occurring is not usable such that throughput in the manufacturing system is stopped. As such, production efficiency can be reduced. Further, once the manufacturing system restarts, each moving element on the conveyor system generally needs to be reset and/or located by the conveyor system and then slowly accelerated to reach operational speed. Locating and reinitiating the conveyor system can further increase downtime for production and reduce efficiency.

Conventional high force and/or momentum (acceleration and/or speed) systems such as linear motor conveyor systems, linear actuators, robots and the like tend to either be operating at full speed or stopped. Whenever a human is present, the systems generally need to be stopped or very closely controlled for safety reasons. While there have been some attempts to accommodate the use of both manual (i.e. human) stations in addition to high speed automated processing by implementing software or mechanical methods to control the force/speed of the machines, these control systems tend to be very complex and thus increase expense and possibilities for error. Further, safety regulations may require that a system cannot be able to operate at high force/momentum if humans will be present due to a risk that the system may jump to high force by accident or the like.

Similar issues can occur when a high force manufacturing system or conveyor system is being constructed. For example, when building a linear motor conveyor, it is important to have easy access by humans while testing the system, sometimes prior to building an enclosure or implementing other appropriate safety systems. With conventional linear motor conveyors, the need to have safety control implemented in advance can increase the time to build a conveyor system, may require employees to have further specific training for the system, or may delay testing until the system is fully built, which may make problems and/or repairs more difficult to find and complete.

In the example of a linear motor conveyor system, a target for operating below a hazardous level without stopping entirely is believed to be a maximum speed of between about 100 mm/sec to about 250 mm/sec or at a level within this range. In a particular example, the maximum speed may be approximately 150 mm/sec. These speed values will also depend on the weight of the moving element (and materials loaded thereon) when it comes to determining the maximum safe force. In order to achieve these operating conditions, it is necessary that the force applied to the moving elements is sufficiently high to overcome any inertia of the moving element, for example friction, weight of moving element/payload or the like, but low enough as to not cause injury to a human (or in some cases, to the payload) in an impact. In some cases, the speed may be further limited to a speed that allows for manual operations on a product while the product is being carried by the moving element.

In collaborative areas, the force and/or momentum of the conveyor system or machines can be set at a level to allow operators to be able to stop a pallet by putting a counter force against the movement of the pallet, for example, if a hand/finger is placed on the pallet or if a hand is sandwiched between a moving pallet and a stationary pallet, the force and/or momentum would not be enough to cause injury. In the collaborative areas, the low force mode will inherently require low acceleration as the control system will control the force to be under levels which would achieve high acceleration. For example, in a specific case, accelerations may be configured to be below 0.5G in low force sections while in high force sections acceleration can match the upper limits of the conveyor system or capabilities of the product on the pallet, which, in some cases, may exceed 5G.

Embodiments of the system and method herein are intended to allow for more flexibility in manufacturing system construction, testing, configuration, and maintenance. In embodiments herein, manufacturing systems may include a combination of non-collaborative areas/sections (i.e. high momentum/force of moving parts), which are generally guarded/enclosed, semi-collaborative areas/sections (i.e. sections which may be guarded/enclosed to run at high speed but in which humans may have at least some access) and, in some cases, collaborative areas/sections (i.e. sections in which humans have access without entering a guarded area) and the like.

Figure 2:
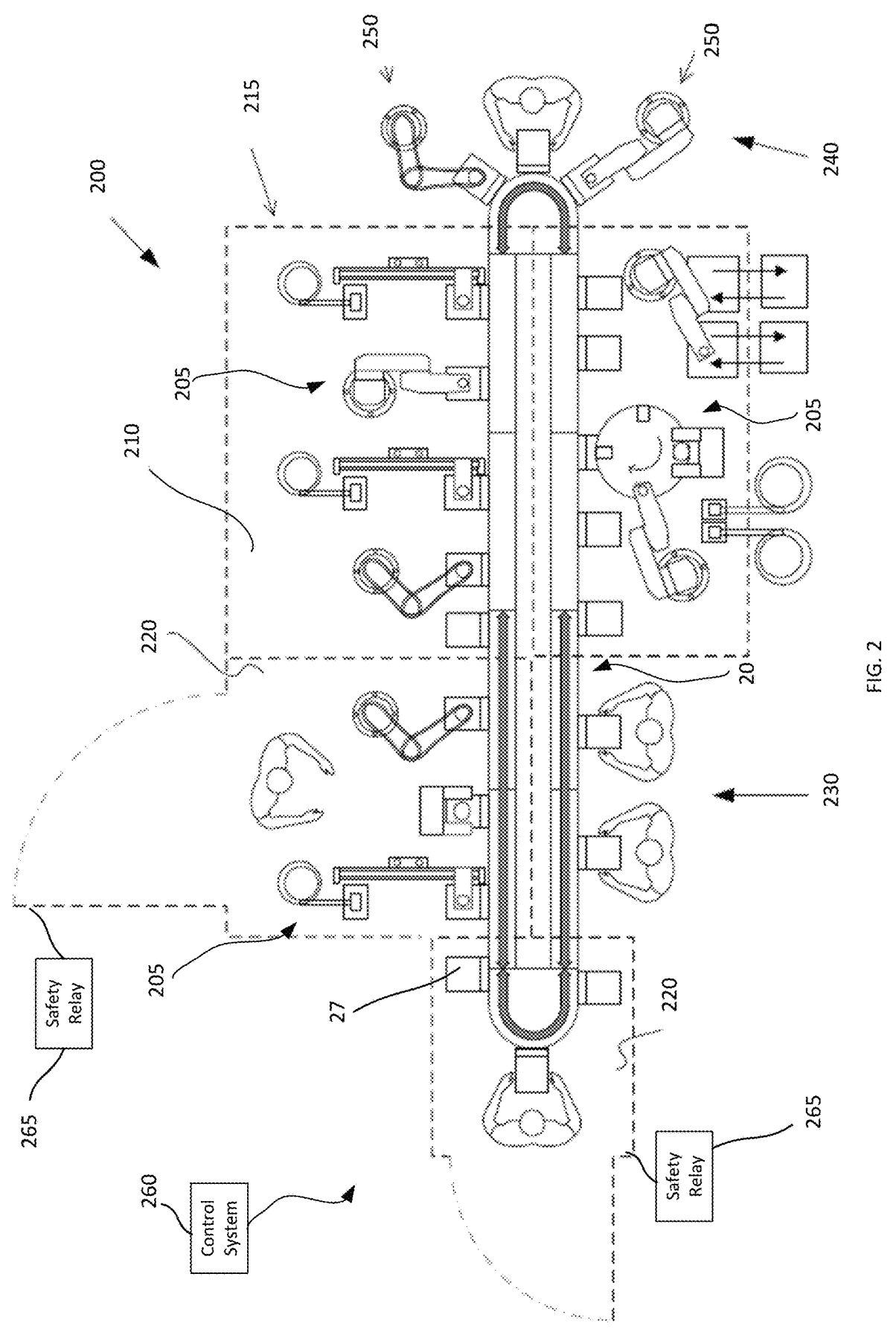
FIG. 2 illustrates an example of a manufacturing system having collaborative and non-collaborative areas.

FIG. 2 illustrates a manufacturing system 200 (including a linear motor conveyor system 20) with a combination of non-collaborative, semi-collaborative and collaborative areas. As illustrated in FIG. 2, the manufacturing system 200 also includes automation stations 205 arranged around the linear motor conveyor system 20. The manufacturing system 200 includes a first area 210, called a non-collaborative area, enclosed by an enclosure/guard 215 to prevent human access. In a second area 220, sometimes called a semi-collaborative area 220, that manufacturing system operates at a high force level within an enclosure 215 until, for example, a door is opened, a setting is changed or a safety relay is triggered via, for example, an operator entering the enclosure (as illustrated in FIG. 2) for any reason, for example, to perform maintenance, perform an audit, or the like. In some cases, the safety relay may be triggered by, for example, opening an enclosure door or entryway, sensing via light curtains, motion sensors of various kinds, weight detecting pads, WiFi monitors or other commercially available safety detection mechanisms. The safety relay may cause operations in the semi-collaborative area to stop or may cause the semi-collaborative area to operate with lower speeds/forces and safety gates as described in further detail below. If an operator the leaves the semi-collaborative area and close the door, activates a switch, or the like, the semi-collaborative area can continue with automated operations and the safety gates on the linear motor conveyor system could be opened such that the linear motor conveyor system could operate in a non-collaborative mode.

In a third area 230 or 240, called a collaborative area, manual operations can be performed without an enclosure. As described below, the collaborative area may be protected by safety gating. In FIG. 2, area 230 illustrates workers interacting with parts on moving elements 27 of the linear motor conveyor system 20 while area 240 illustrates workers interacting with both the moving element 27 and robots 250. It is intended that these semi-collaborative and collaborative areas will have safety gates on the linear motor conveyor system 20 while other machines such as robots 250, or the like, will be operable only in a safe mode.

The manufacturing system 200 includes a control system 260 to control operation of the manufacturing system 200, including the automation stations 205. The manufacturing control system 260 will interact with the linear motor control system 40 (not shown in FIG. 2). The manufacturing system 200 and manufacturing control system 260 will also include or be provided with feedback from various safety relays such as safety relays 265 connected with enclosures 215 to notify the manufacturing control system 260 of a change in status such as, for example, opening a door in the enclosure 215. The safety relays 265 may be any of various types that are available on the market. The required level of safety can be achieved by appropriately configuring the safety relay, for example, Category 1-4 Performance Level A-E as required per the ISO 13849 standard. The manufacturing control system 260 may also receive other types of feedback from automation stations or safety relays provided to automation stations with indications of faulty performance, obstructions or other indicators of safety issues.

Figure 3:
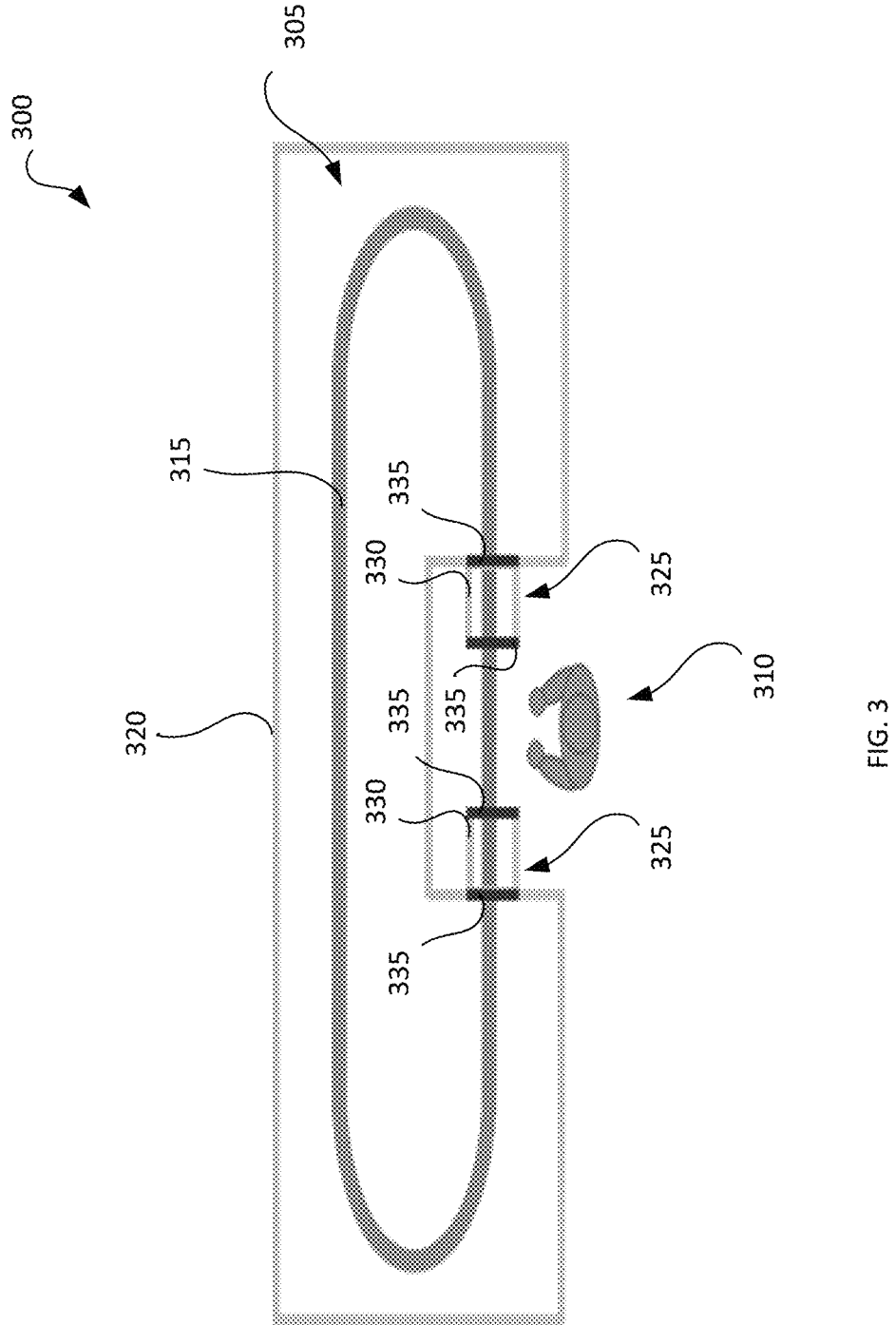
FIG. 3 illustrates a schematic diagram of a system for controlling a collaborative section of a linear motor conveyor according to an embodiment.

FIG. 3 is a simplified schematic illustrating the use of safety gates according to an embodiment herein to isolate a collaborative or semi-collaborative area. Although not specifically shown in FIG. 2, the safety gates of FIG. 3 can be in place at appropriate locations in FIG. 2. FIG. 3 illustrates a manufacturing system 300 including a non-collaborative area 305 and a collaborative area 310. The manufacturing system 300 includes a conveyor system 315 and will generally also include manufacturing stations (not shown). The non-collaborative area 305 is protected by an enclosure 320. The collaborative area 310 includes two safety gates 325 that operate to allow an opening in the enclosure 320. Each safety gate 325 includes a body 330 with a door 335 on each side of the body 330. In operation, only one door 335 on each safety gate 325 can be opened at a time so that the collaborative area 310 remains isolated from the non-collaborative area 305.

Figure 4:
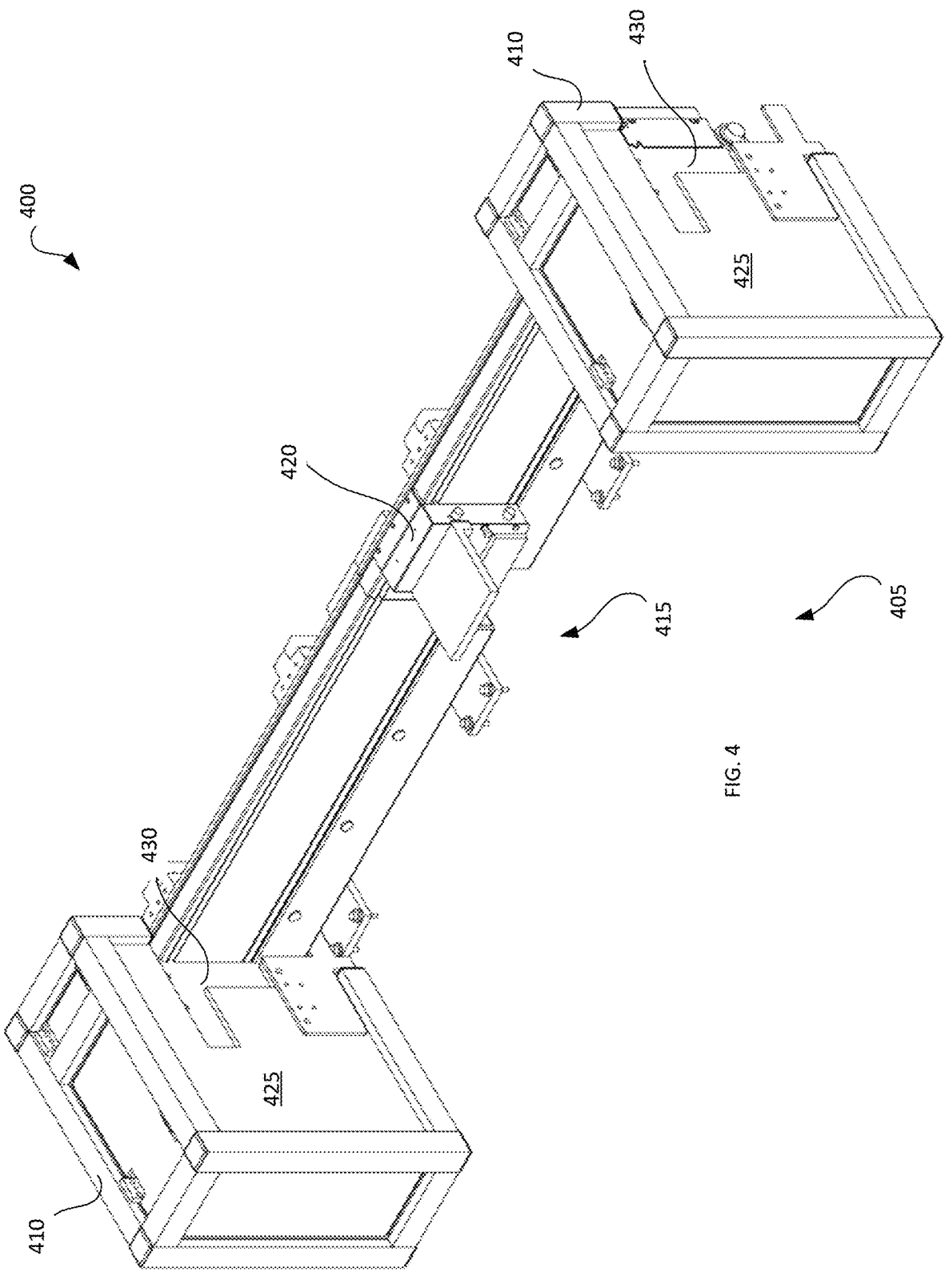
FIG. 4 is a perspective view of an embodiment of another system for controlling a collaborative section of a linear motor conveyor.

FIG. 4 is a perspective view of a portion of a linear motor conveyor system 400 illustrating a collaborative area 405 and safety gates 410. The collaborative area 405 includes a track section 415 with one or more moving elements 420. The track section 415 is provided with two safety gates 410, one at either end of the track section 415. Although not shown, there would also be a track section outside of each of the safety gates 410 as well as an enclosure that would prevent access to any areas outside of the safety gates (see FIG. 3 as an example). As discussed further below, each safety gate 410 includes a body 425 and a door 430 on each side of the safety gate 410.

Figure 5:
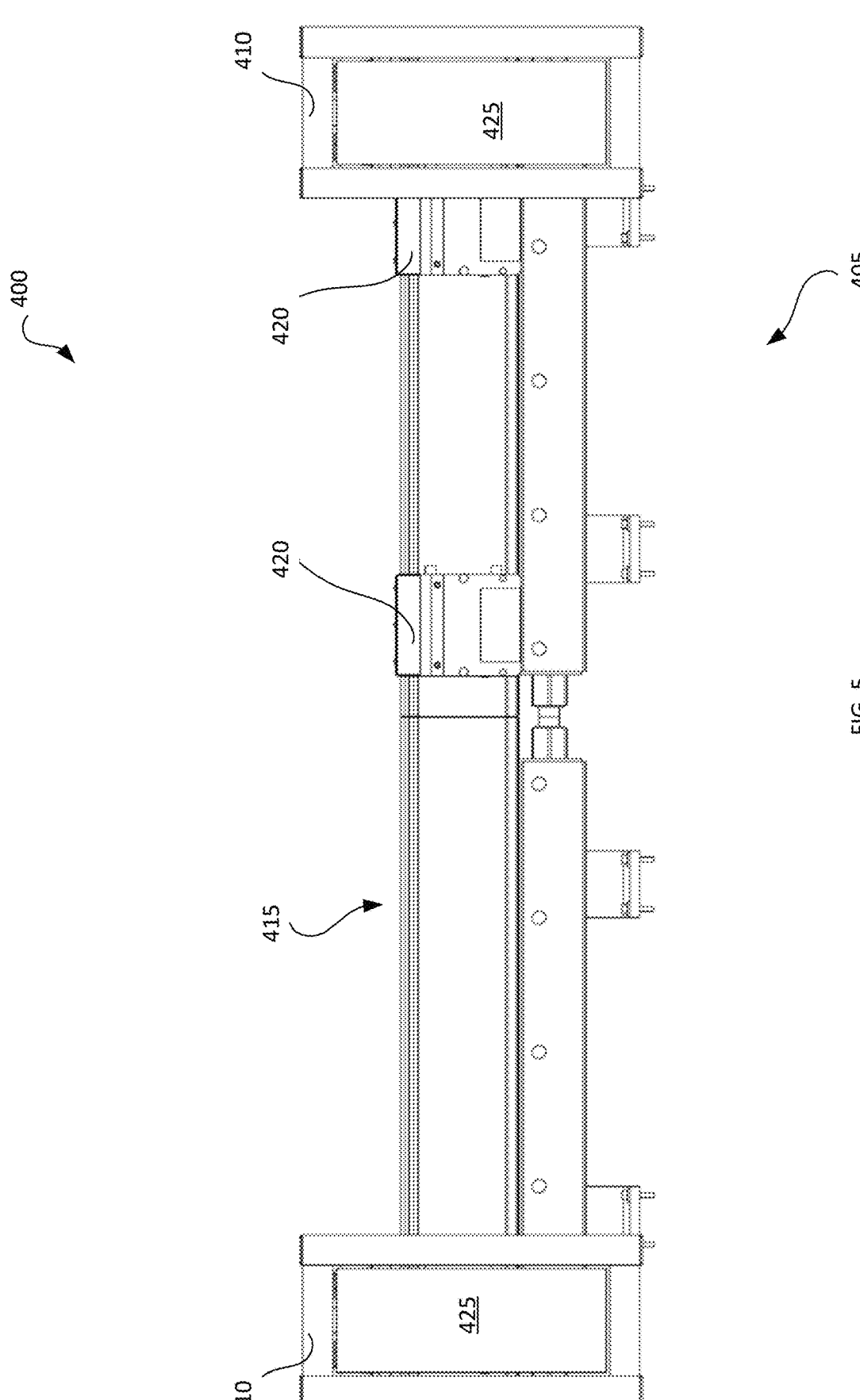
FIG. 5 is a front view of the embodiment of FIG. 4.

FIG. 5 is a front view of the collaborative area 405 shown in FIG. 4. In FIG. 5, another moving element 420 can be seen entering the right safety gate 410.

Figure 6A:
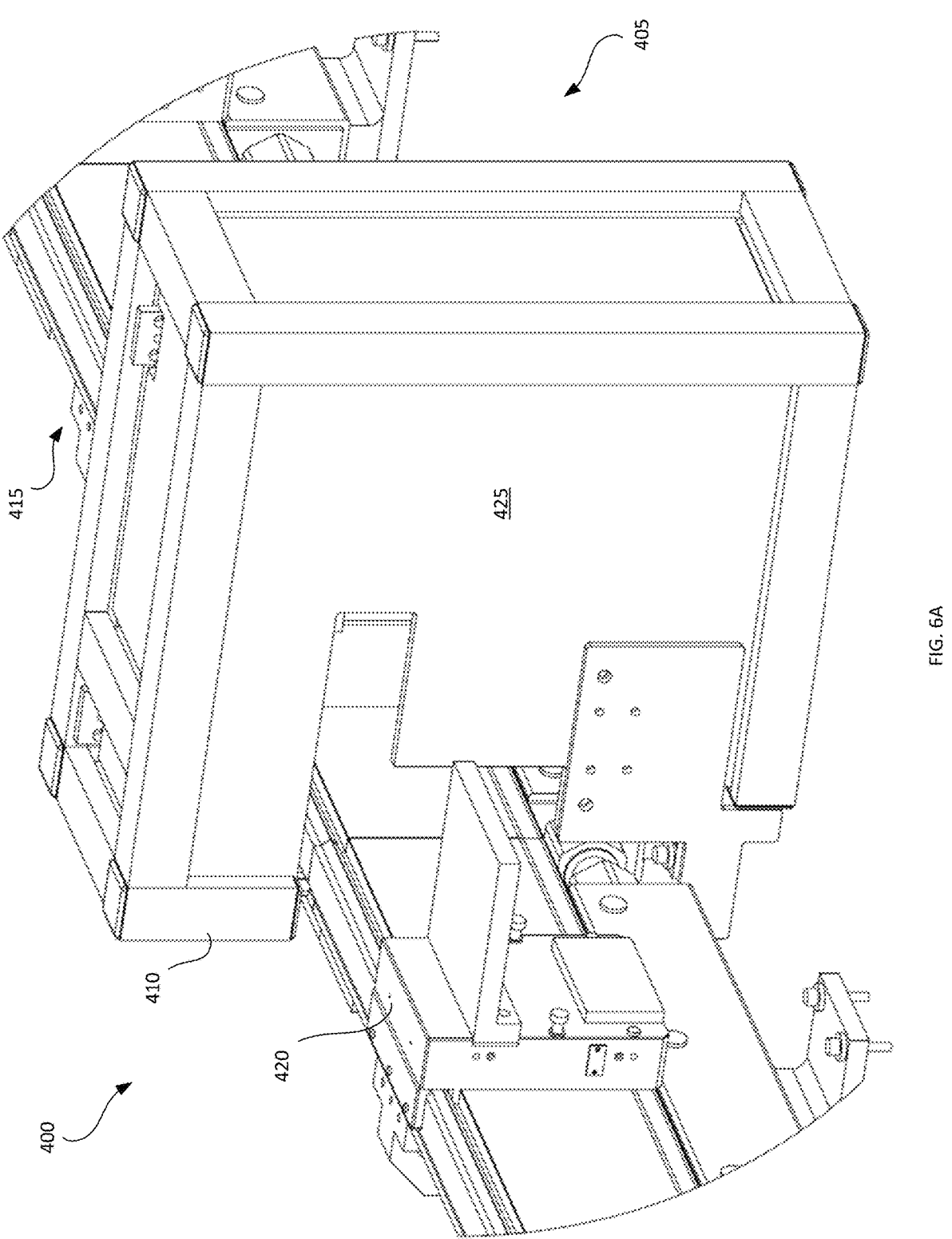
FIGS. 6A to 6H illustrate an example operation of the embodiment of FIG. 4.
Figure 6B:
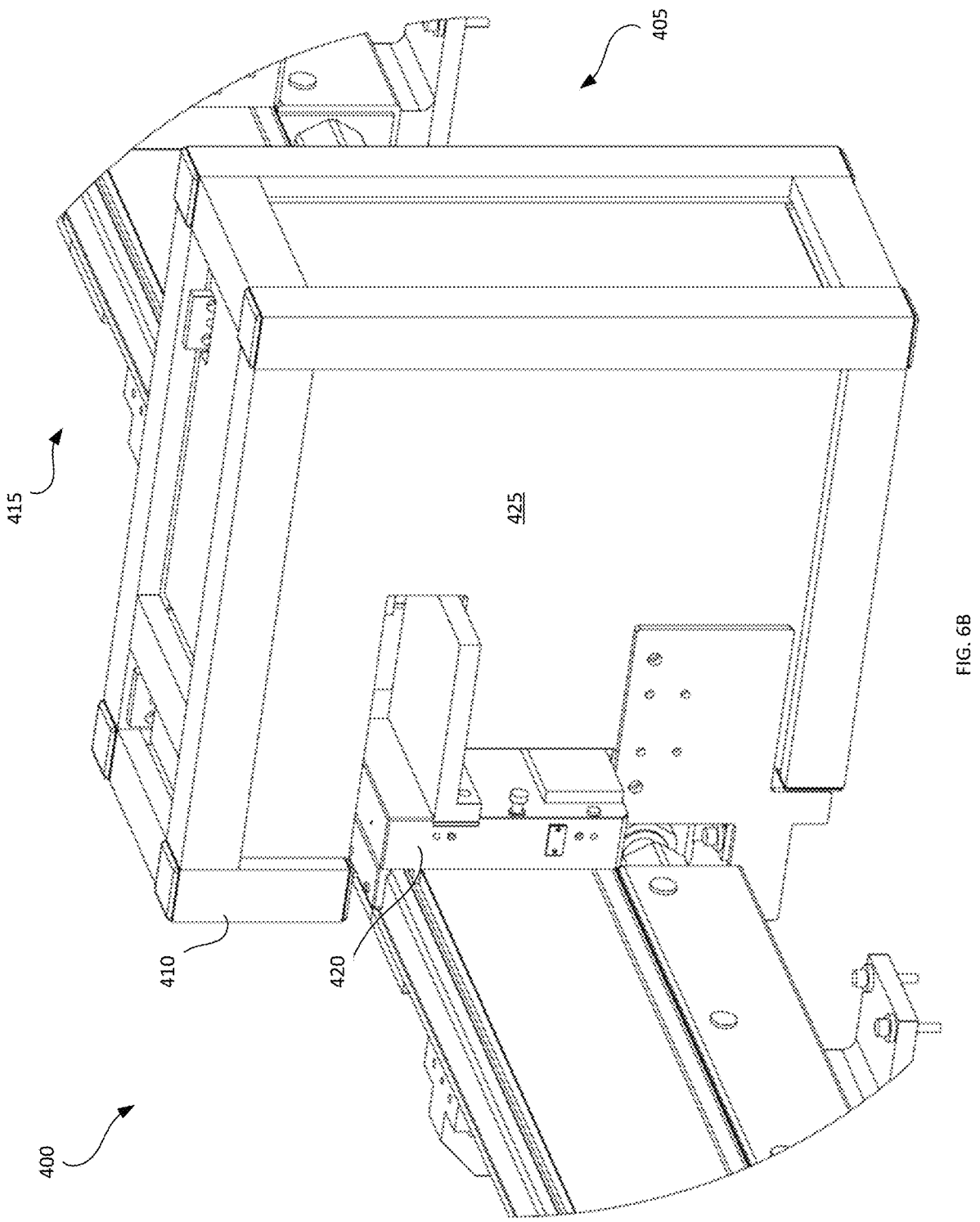
Figure 6C:
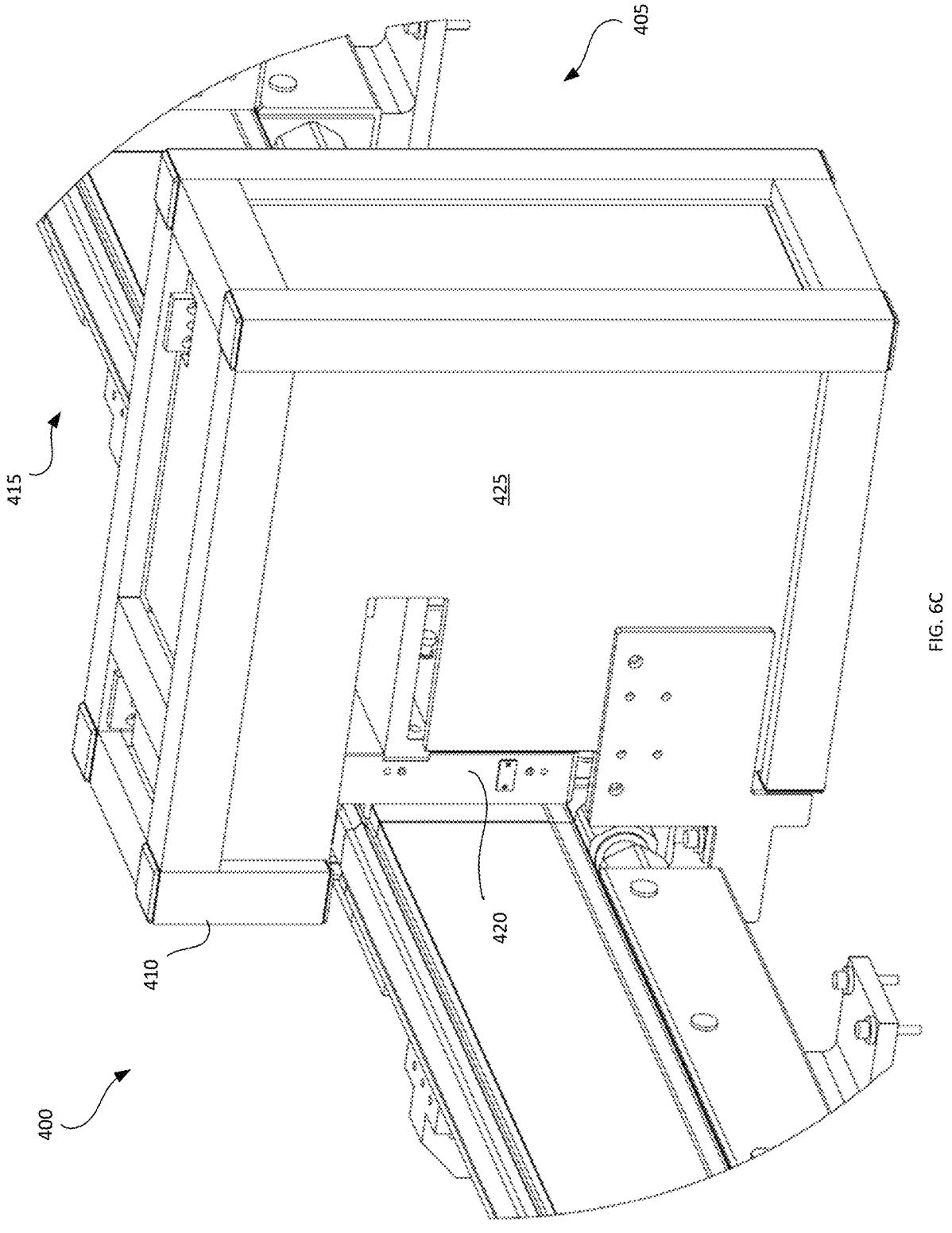
Figure 6D:
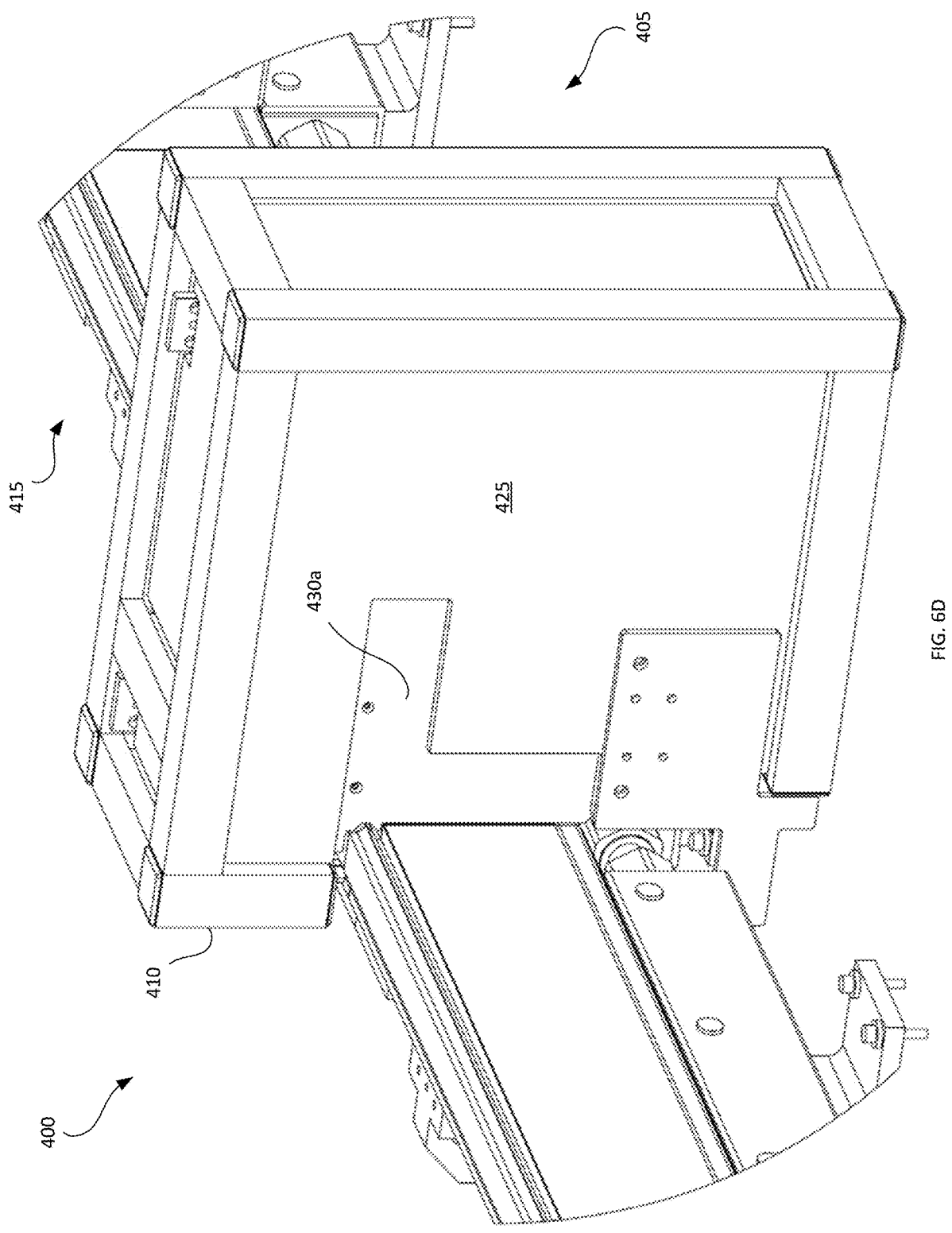
Figure 6E:
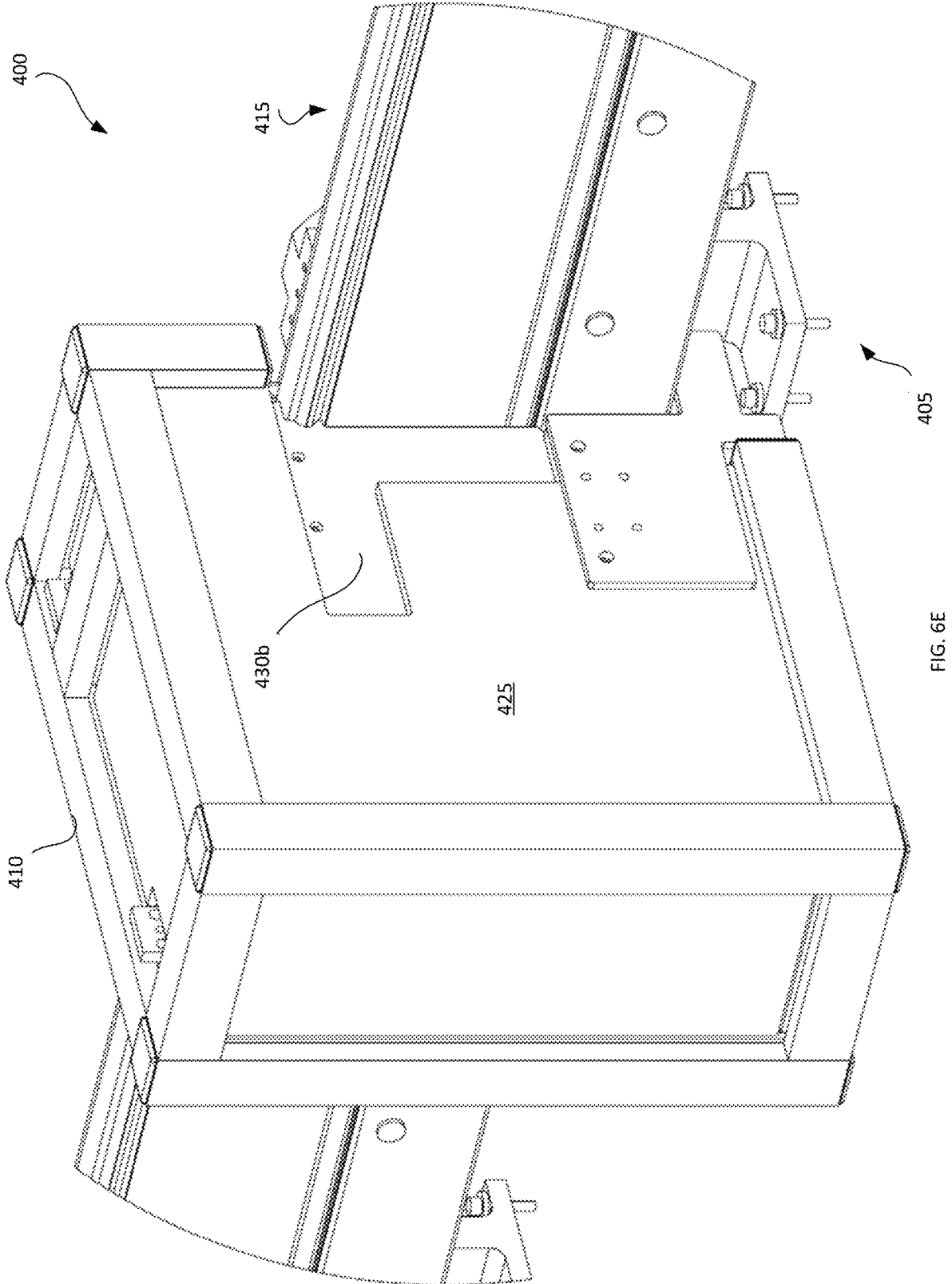
Figure 6F:
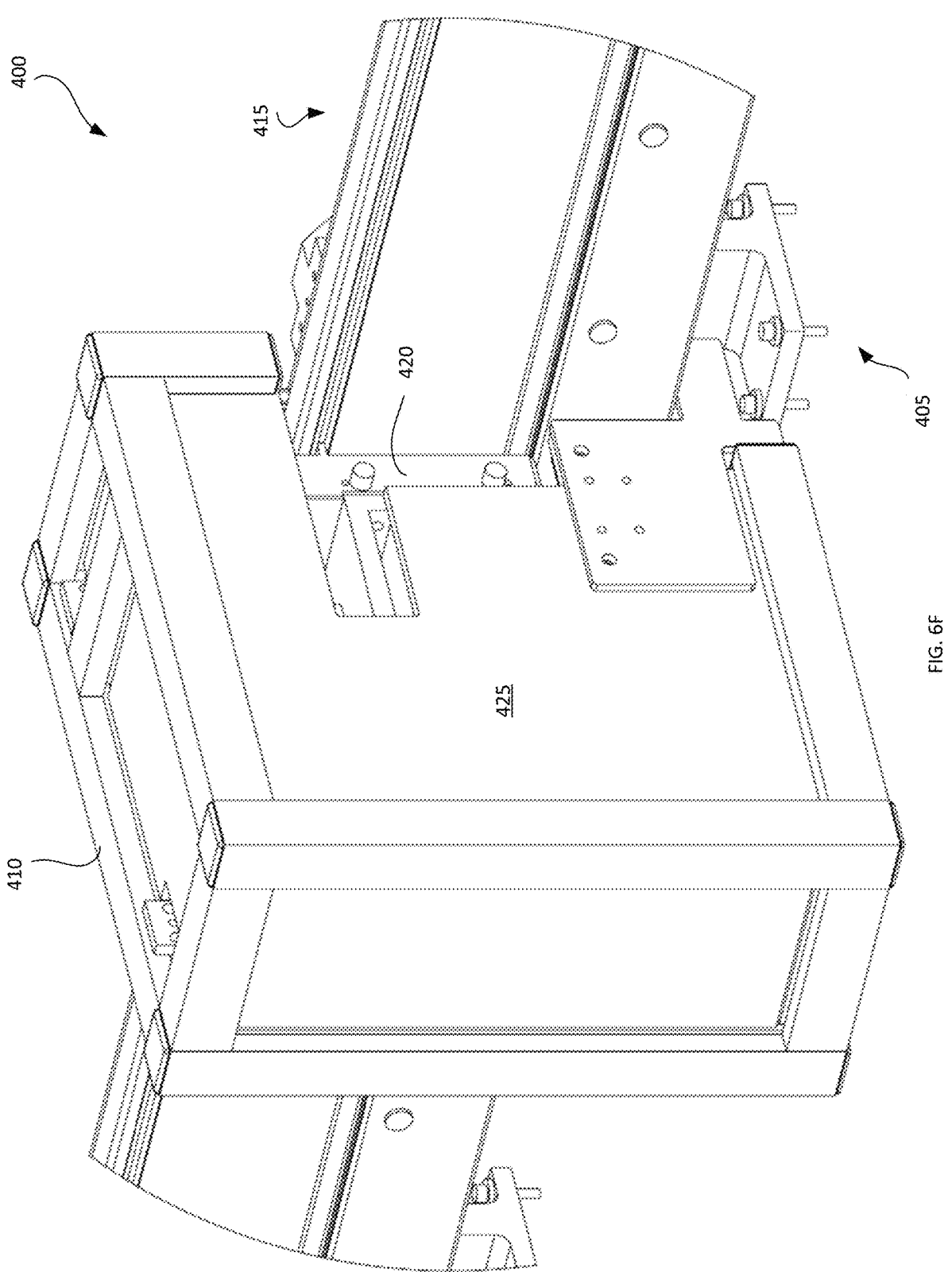
Figure 6G:
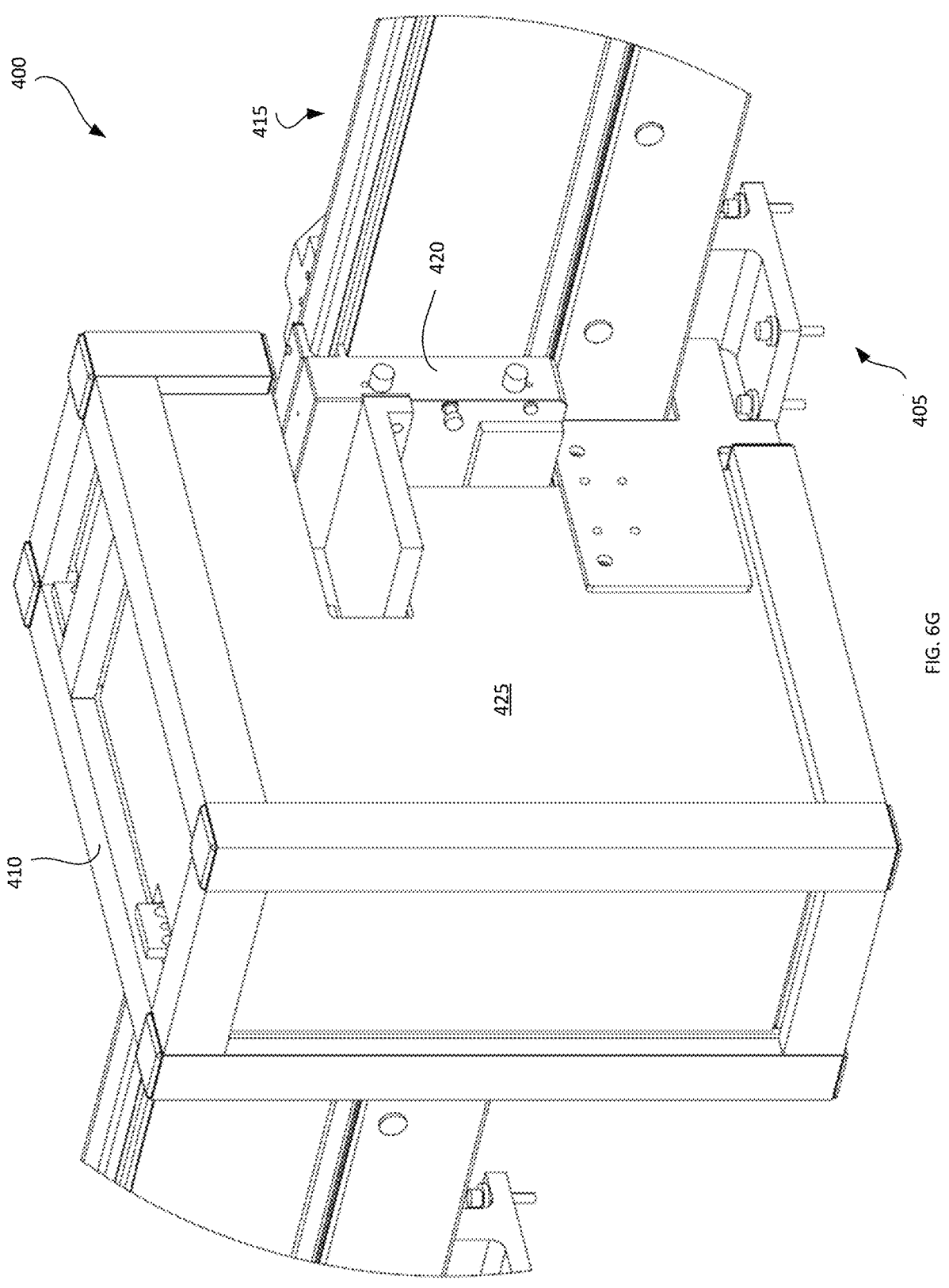
Figure 6H:
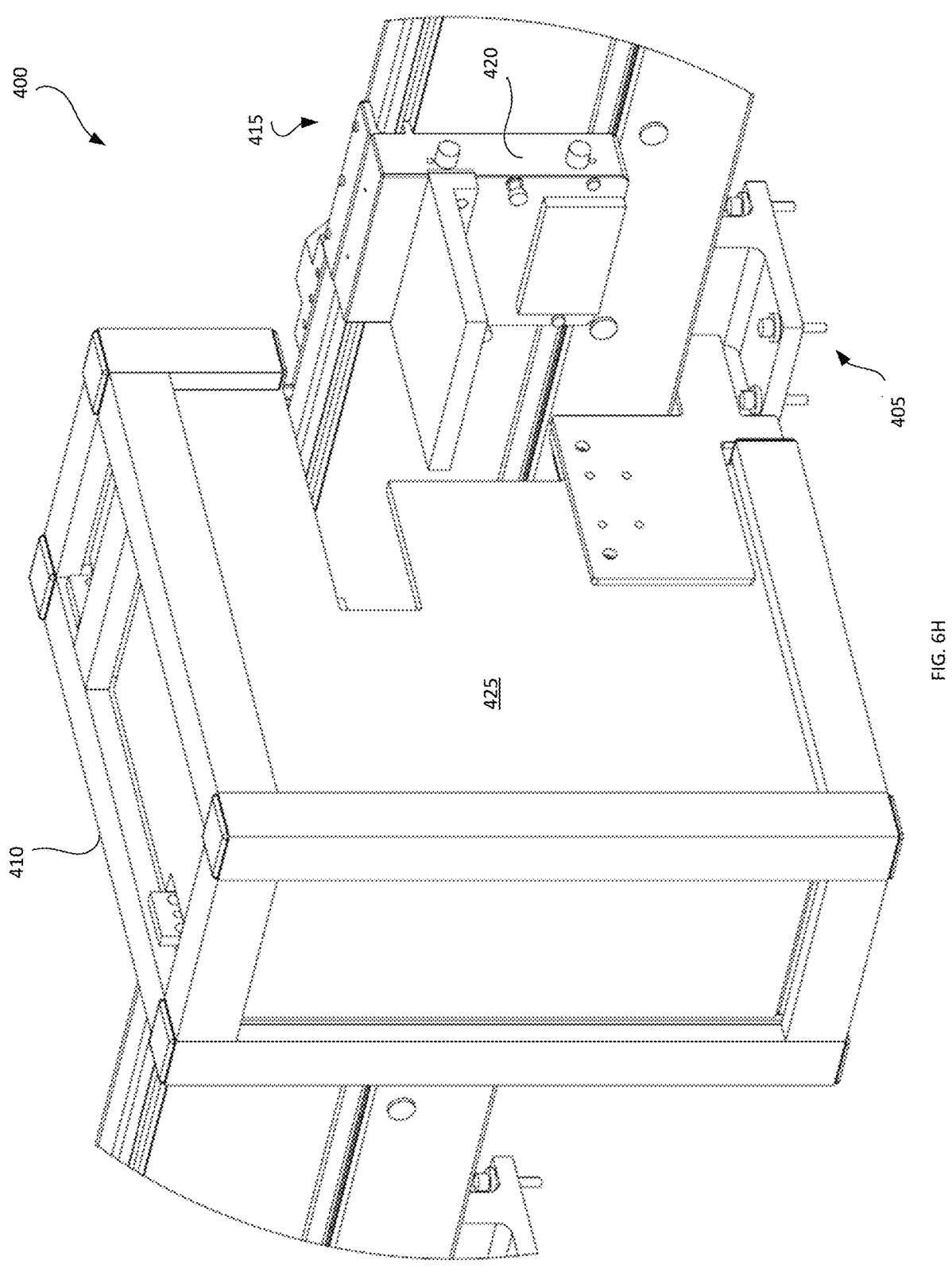

FIGS. 6A-H illustrate the operation of a safety gate. In FIG. 6A a moving element 420 is travelling toward the safety gate 410. As illustrated, a non-collaborative-side door 430a of the safety gate 410 is open and ready to receive the moving element 420. The door 430a may have opened in preparation for the arrival of the moving element or may remain open as long as the collaborative-side door 430b (shown in FIG. 6E) is closed. FIG. 6B shows the moving element entering the safety gate 410. FIG. 6C shows the moving element when fully within the safety gate 410. In FIGS. 6B and 6C, the collaborative-side door 430b remains closed. FIG. 6D shows the safety gate 410 with the non-collaborative-side door 430a closed. FIG. 6E is a view from the collaborative area 405 of the safety gate 410 and shows the collaborative-side door 430b closed. The timing of the operation of the non-collaborative-side door 430a and the collaborative-side door 430b can be determined based on relevant safety protocols or regulations. In some cases, there will need to be a period where both doors are closed at the same time, in others, a door may open simultaneously with the closing of the other door. FIG. 6F shows the situation after the collaborative-side door opens and FIGS. 6G and 6H show the moving element moving into the collaborative area. As long as the collaborative-side door is open, the non-collaborative-side door remains closed. In some cases, the width of the safety gate can be configured to provide for a moving element to continue moving but allow time for a non-collaborative-side door to close before a collaborative-side door opens. In this way, the moving element does not necessarily need to stop within the safety gate. In a similar way, a speed of the moving element can be controlled within the safety gate to allow time for the operation of the safety gate without a need to stop the moving element.

Figure 7A:
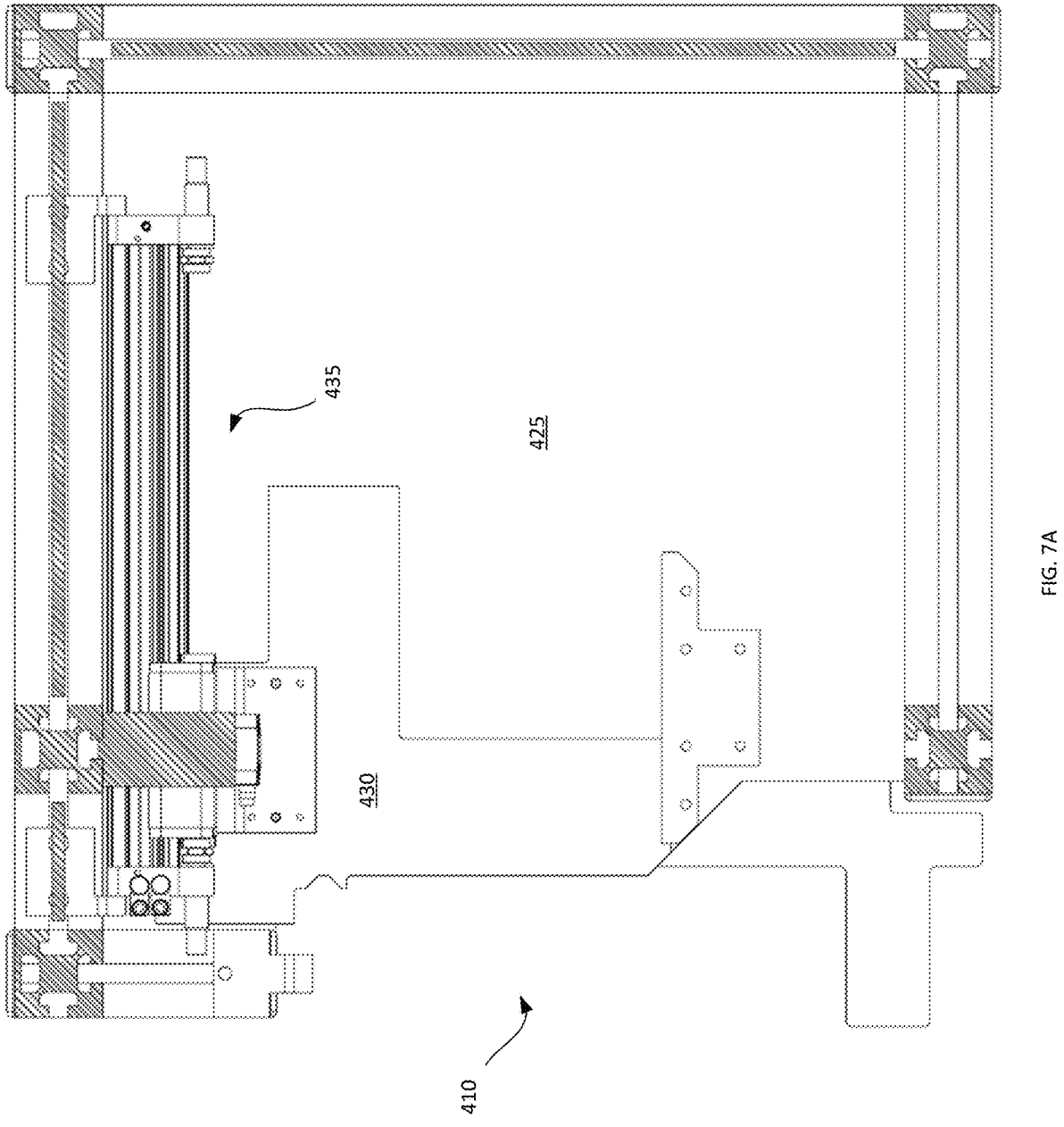
FIGS. 7A and 7B are cross-sectional views of a safety gate of the embodiment of FIG. 4 showing the safety gate in operation.
Figure 7B:
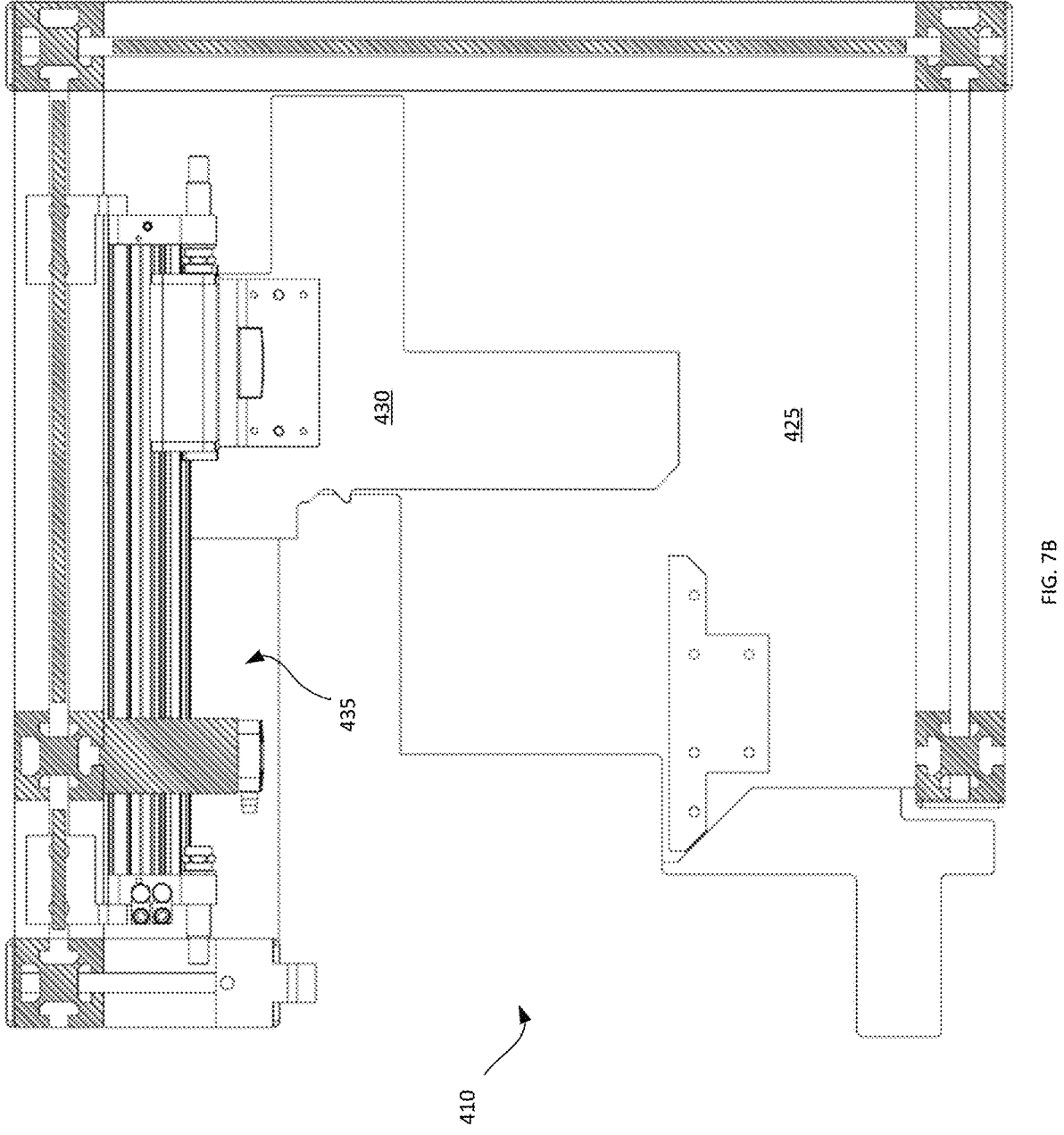

FIGS. 7A and 7B illustrate an embodiment of the operation of doors 430 on the safety gate 410. FIG. 7A illustrates the door 430 in a closed position and FIG. 7B illustrates the door 430 in an opened position. The door 430 can be moved by a door actuation mechanism 435. The type of door actuator mechanism can be varied but, in at least some embodiments, there can be an interlock, which may be mechanical or electrical, such that one door 430a on a safety gate 410 cannot be actuated to open until a corresponding door 430b on the safety gate 410 has been closed.

Figure 8:
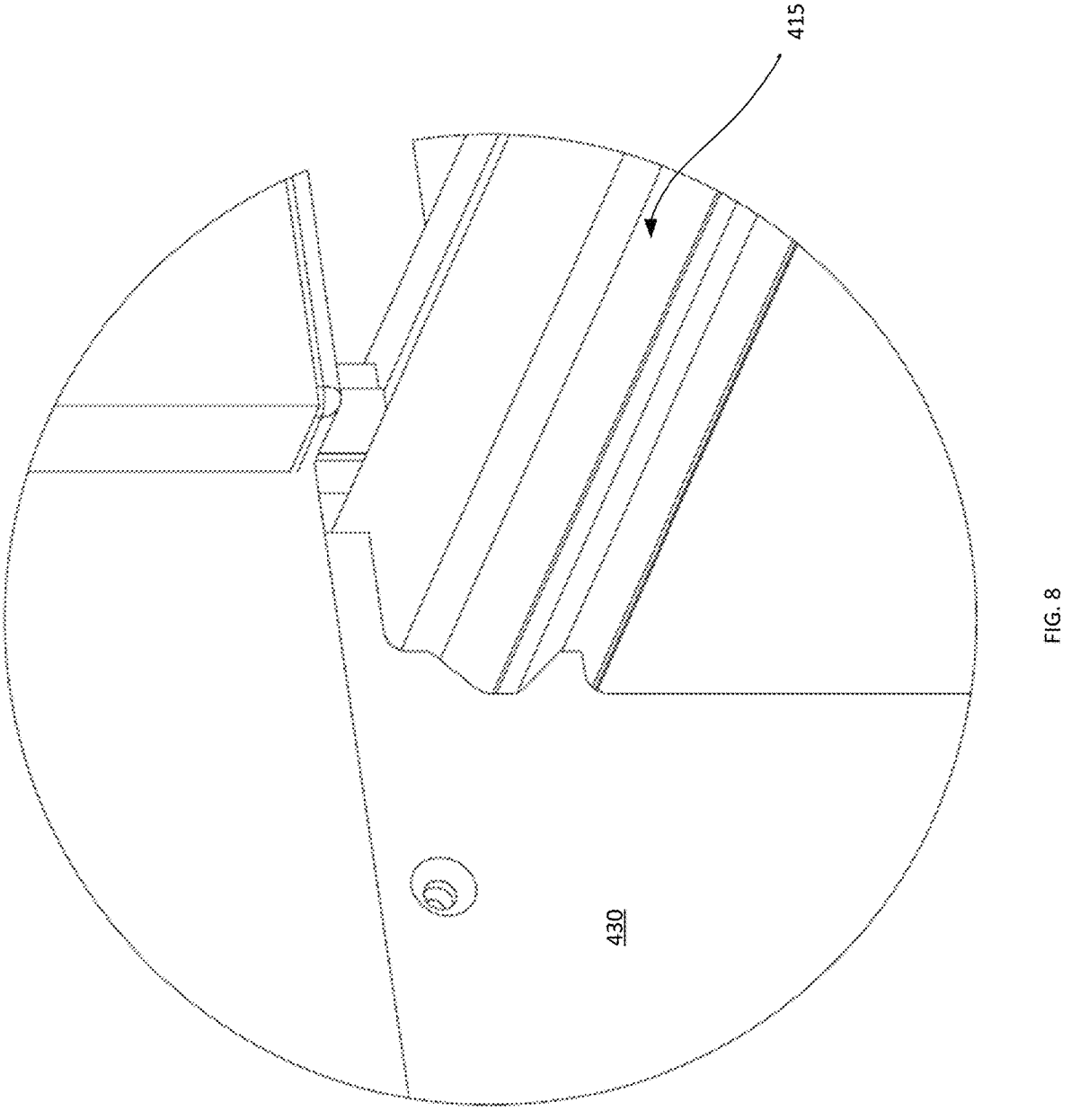
FIG. 8 is a close-up view of a door of the safety gate of FIG. 7A and associated track section.

FIG. 8 is a close-up view of the interaction between the door 430 and the track section 415. As shown in FIG. 8, the door 430 is configured to match closely/conform with a shape of the moving element and any payload and also match/conform with a shape of the track section 415, when closed, so that there is little to no risk of an operator/user trying to or being able to reach through the door 430 at any time.

In some embodiments, the safety gates 410 at each side of the collaborative area 405 will operate using an interlock system so that at least one door 430 on the safety gate 410 will be closed at all times. This would generally be the situation for safety gates around a collaborative area. In other embodiments, the safety gates 410 may include a high-force mode that allows all doors to remain open when there is some sensor/indicator that an operator/user is not present, such as in semi-collaborative areas, when an operator will only be present sometimes. For example, as shown in FIG. 3, there may be a semi-collaborative area 220, where an operator/user must enter an enclosure around the semi-collaborative area 220. In this case, the enclosure can include at least one safety relay intended to operate whenever the enclosure is opened, for example, the safety relay may be triggered by a door being opened, an operator switching a control, an alarm/sensor being triggered, based on a predetermined schedule, or the like. When the safety relay is triggered to indicate that an operator is present, the system/safety gates can operate in a safe mode, whereas when the safety relay is not triggered, indicating that an operator is not present, the system/safety gates can operate in high-force mode, i.e. have all doors of the safety gates open.

In some embodiments, the control system for the manufacturing system and/or the linear motor conveyor system may include a plurality of safety relays, which may be controlled by changes in status of the manufacturing system and/or linear motor conveyor system. Generally speaking, each safety relay can be triggered to place a region/area (or all) of a manufacturing system into a collaborative mode such that injury to personnel is prevented. For example, in some cases, the triggering interface may be a guard circuit interface, in which the change in status might be the opening of a guard gate/enclosure preventing access to the manufacturing system or linear motor conveyor system. Other changes in status may include, for example, the pressing of an alert button, scheduled maintenance, identification of a defective product, or the like.

The use of safety gates on the conveyor system, safety relays and enclosures can allow for, for example: switching an area between operators doing manual assembly over to high speed automation and back to manual operations easily;

an area that operates high speed when no people are present and automatically goes down to low speed/low force whenever people come in close proximity to the area and back to high speed when they leave; allowing moving elements to safely travel through an area that is under maintenance or other purposes so the rest of the manufacturing system/line can continue to operate; allow people to safely access products travelling on the line for quality audit, manual repairs, and the like; and allow moving elements to move around the system in a safe way during system build and integration before all of the enclosures and the like are installed.

As noted above, embodiments of the system and method may be introduced to allow for track sections where moving elements can continue to operate collaboratively with a human/worker in the vicinity, for example when an operator is working on a part, attending to maintenance or repairs, or the like. In order to do this, collaborative areas include the safety gates to prevent fast moving forceful moving elements from entering the collaborative area and also have the track sections in the collaborative area configured such that moving elements will not move with more force than acceptable. In semi-collaborative areas where moving elements can operate in collaborative mode and non-collaborative mode depending on the settings of the safety relays, track sections may have two operating levels (low power and high power, respectively) that are interlocked with the safety gates such that the safety gates will not open if the track section is at a high power level.

An example of a linear motor conveyor and manufacturing system that can be operated at, at least, two operating levels is provided in US Pat. Pub. No. 20210284461, which is incorporated herein. Using this type of arrangement, collaborative areas could have the linear motor conveyor system locked at a reduced power supply that may still allow the moving elements to travel on the conveyor, for example, approximately 1V DC rather than 28V DC. This lower voltage is intended to reduce maximum attainable coil current and as a result reduces the maximum attainable pallet/moving element force/momentum and acceleration/speed to safe or safer levels. In addition, in some cases, the maximum attainable pallet and/or moving element velocity is also reduced as the pallets' back-EMF will limit pallet speed to lower levels. In semi-collaborative areas, the linear motor conveyor system could have two power levels but with an interlock to the safety gates provided at either end of the semi-collaborative area. In a collaborative area, the linear motor conveyor system can be configured such that an operator can stop a moving element with a finger and then start the moving element again by pushing with a finger.

Figure 9:
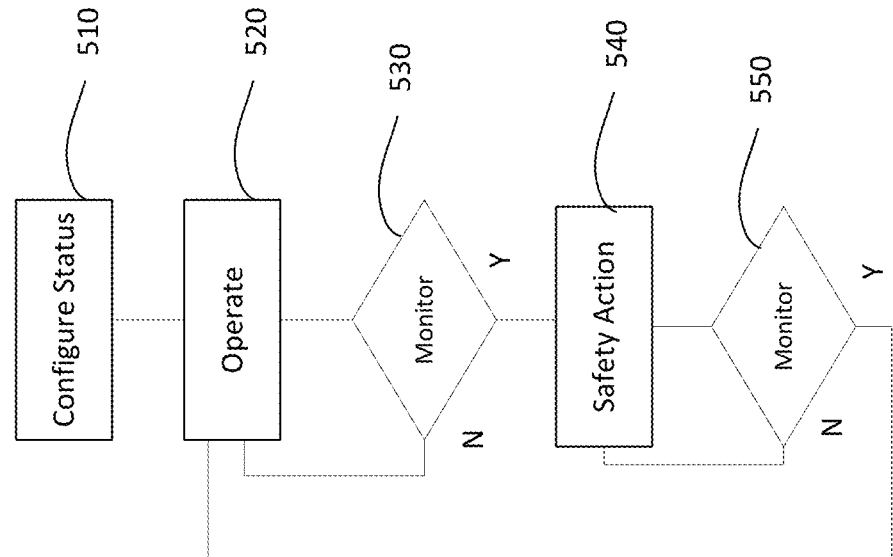
FIG. 9 is a flowchart of an embodiment of a method for collaborative linear motor conveyor operation.
Figure 9:
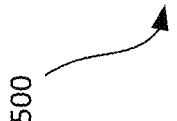

FIG. 9 illustrates an embodiment of a method 500 for controlling a manufacturing environment/system. At 510, the control system determines an operating status of each area of the manufacturing system. The operating status may include non-collaborative, collaborative, semi-collaborative. At 520, the manufacturing system begins operation. At 530, the control system monitors for a safety trigger, which may include a safety alarm, such as a door opening on an enclosure around the non-collaborative area, an operator presence sensor being activated, or the like, or a scheduled maintenance, or the like. If a safety trigger is activated, at 540, the control system takes a safety action and controls the manufacturing system according to the type of trigger, this may include stopping operations, moving the entire manufacturing system to operate in a collaborative mode, (i.e. a lower force/momentum mode) or, for non-collaborative areas or semi-collaborative areas, only adjust that non-collaborative or semi-collaborative area to operate in collaborative mode. At 550, the control system then monitors if the safety trigger is removed or ended. If the safety trigger is not removed, the safety actions remain in place. If the safety trigger is removed, the control system can return to operating in the configured mode 520. Otherwise, the control system will remain in the safety mode 540. Generally speaking, there may be situations where the manufacturing system/control system will default to safety mode operation unless a safety relay is reset and ready to monitor for any changes in status of the operation. In some cases, the semi-collaborative mode is set to operate the same as a non-collaborative mode until a safety trigger is activated and the semi-collaborative mode then operates in collaborative mode.

Figure 10:
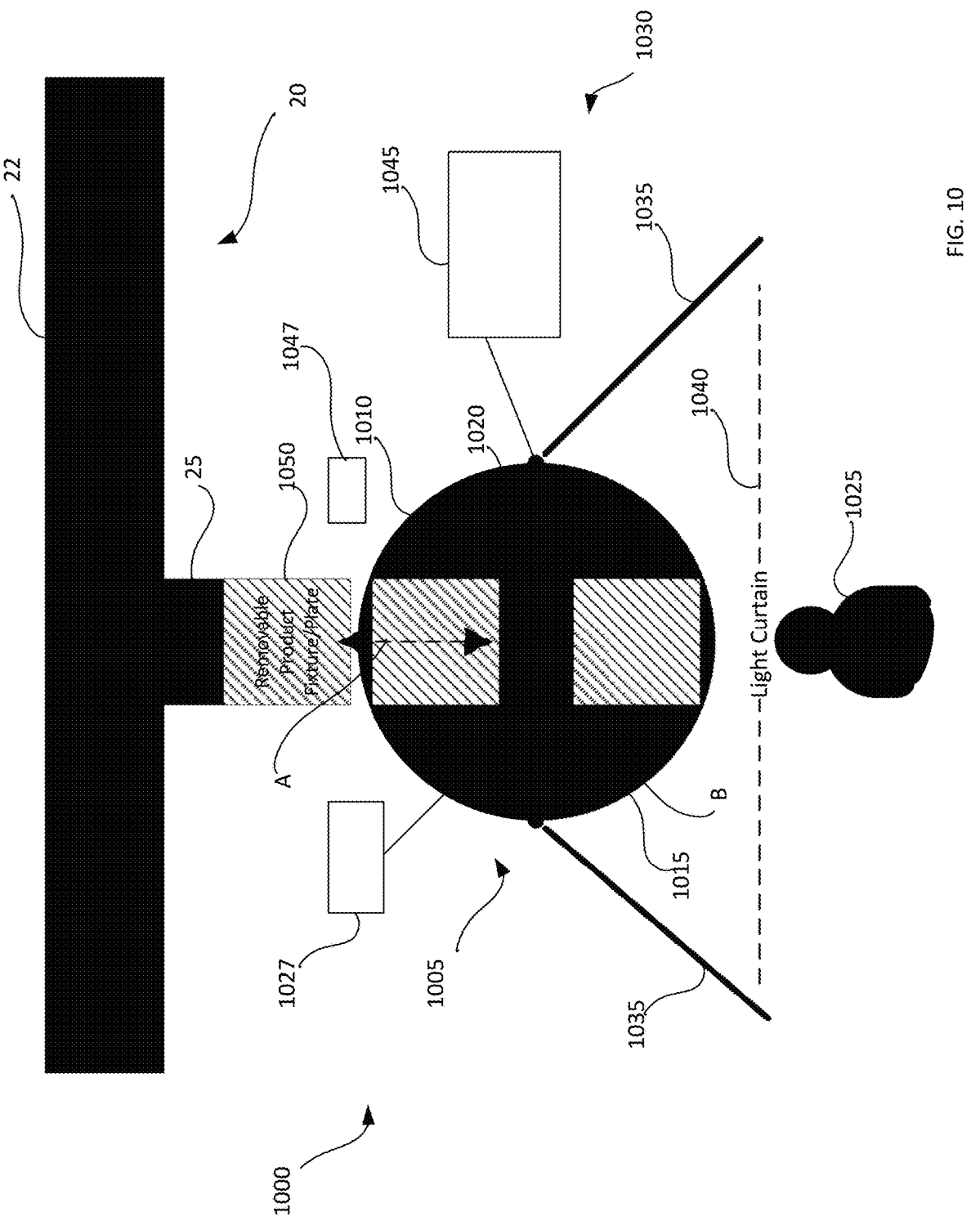
FIG. 10 is a schematic view of an alternative embodiment of a system and method for collaborative operations on a linear motor conveyor system.

FIG. 10 illustrates another embodiment of a system 1000 for collaborative work on a linear motor conveyor. In this case, the system 1000 allows a human operator to access parts from a moving element without the need for safety gates on the linear motor conveyor system. In the embodiment of FIG. 10, the linear motor conveyor may be similar to that illustrated in, for example, FIG. 1. As illustrated in FIG. 10, the system 1000 includes a rotating table 1005 placed adjacent to the linear motor conveyor system 20. The rotating table 1005 includes a semicircular enclosed side 1010 near the conveyor system 20 and a semicircular accessible side 1015 opposite the enclosed side 1010. It will be understood that each side may be some other portion than a semicircle and that the rotating table may also have a different shape. The rotating table 1005 may include a barrier 1020 between the enclosed side 1010 and the accessible side 1015 to prevent an operator 1025 from reaching through the barrier 1020. In other cases, the rotating table 1005 may be sufficiently large that the operator 1025 cannot reach to the enclosed side 1010. The rotating table 1005 can be rotated by an apparatus 1027, such as a motor, cam, or the like. The rotating table 1005 will generally be integrated with general barriers (not shown) that prevent the operator 1025 from approaching the linear motor conveyor system 20. The rotating table 1005 may also include a safety system 1030 for detecting if the operator enters a predetermined area around the rotating table 1005, such as the accessible side of the rotating table. The safety system 1030 may include table barriers 1035, a light curtain 1040, and an interlock/relay 1045 for controlling the rotating table 1005.

In operation, a moving element 25 is brought adjacent to the rotating table 1005, a part/workpiece 1050 is moved by an actuator 1047 to the enclosed side 1010 of the rotating table 1005 (arrow A) and the rotating table 1005 is rotated (arrow B) to move the part/workpiece 1050 and provide access to the part/workpiece 1050 on the accessible side 1015. The rotating table 1005 may be configured to move slowly or may be interlocked with the safety system 1030 such that the rotating table 1005 will only move when a worker is not within range of the rotating table 1005. For example, the operator 1025 may be detected by a sensor 1040 such as a light curtain 1040 and the rotating table 1005 may be locked by the interlock/relay 1045. After an operation is performed on the part/workpiece 1050, the operator 1025 can indicate the task complete (or leave the area) and the rotating table 1005 will rotate back and the part/workpiece 1050 can be returned to the linear motor conveyor system 20.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether some of the embodiments described herein are implemented as a software routine running on a processor via a memory, hardware circuit, firmware, or a combination thereof.

The above-described embodiments are intended to be examples only. One of skill in the art will understand that elements of an embodiment may be substituted in other embodiments and that each embodiment may not require each and every element described. Alterations, modifications and variations can be effected to the particular embodiments by those of skill in the art without departing from the scope, which is defined solely by the claims appended hereto.

What is claimed is:

1. A system for collaborative manufacturing system operation for a linear motor conveyor system comprising one or more moving elements, the system comprising:

at least two safety gates arranged on the linear motor conveyor system to provide a collaborative area between the safety gates, each safety gate comprising:

a body;

two doors, one on each side of the body;

an interlock connecting the two doors and configured such that only one door can remain open at a time; and a control system to control operation of the safety gates in coordination with the operation of the linear motor conveyor system.

2. A system according to claim 1, wherein the system further comprises:

a power reduction circuit provided to the linear motor conveyor system in the collaborative area, wherein the power reduction circuit limits the power provided to the linear motor conveyor in the collaborative area.

3. A system according to claim 2, wherein the control system is configured to monitor the power reduction circuit and control the interlock to prevent either of the two doors on each safety gate from opening if the power reduction circuit fails.

4. A system according to claim 1, wherein the system further comprises:

a sensor for detecting if a human is present in the collaborative area; and a safety relay, connected with the sensor, configured to lock both the safety gates open when a human is not present in the collaborative area.

5. A system according to claim 1, wherein the two doors are configured to conform to the shape of the one or more moving elements and payload thereon.

6. A system according to claim 1, wherein the interlock is a mechanical interlock configured such that an opening of one of the two doors, closes the other door.

7. A system according to claim 1, wherein the interlock is configured such that one of the two doors cannot open until the other door is fully closed.

8. A method for controlling a collaborative manufacturing system, the method comprising:

configuring an operating status of each area of the manufacturing system, wherein the operating status of each area comprises one of non-collaborative, collaborative, and semi-collaborative modes, wherein non-collaborative means humans do not have access, collaborative means humans have access, and semi-collaborative means humans may have access;

operating the manufacturing system;

monitoring for a safety trigger and, if a safety trigger is activated, performing a safety action comprising controlling the manufacturing system according to the type of safety trigger and operating status of an area in which the safety trigger occurred;

monitoring if the safety trigger is removed or ended; and if the safety trigger is removed, the control system returns to operating in the configured mode.

9. A method according to claim 8, wherein the safety trigger comprises at least one of: a safety alarm or a scheduled maintenance.

10. A method according to claim 9, wherein the safety alarm comprises at least one of: a door opening on an enclosure around a non-collaborative area, an operator-presence sensor being activated in a semi-collaborative area, and failure of a safety measure in a collaborative area.

11. A method according to claim 8, wherein the safety action comprises at least one of: stopping operation of the manufacturing system, setting the entire manufacturing system to operate in the collaborative mode, setting a semi-collaborative area to operate in the collaborative mode, setting a non-collaborative area to operate in the collaborative mode.

12. A method according to claim 8, wherein the semi-collaborative mode is set to operate the same as a non-collaborative mode until the safety trigger is activated and the semi-collaborative mode then operates in collaborative mode.

13. A system for collaborative manufacturing system operation for a linear motor conveyor system comprising one or more moving elements, the system comprising:

a rotating table placed adjacent to the linear motor conveyor system, wherein the rotating table comprises an enclosed side near the linear motor conveyor system, and an accessible side opposite the enclosed side;

an actuator to move a part from the one or more moving elements to the rotating table or from the rotating table to the one or more moving elements; and an apparatus to rotate the table such that the part moves from the enclosed side to the accessible side and, after action on the part, moves the part from the accessible side to the enclosed side.

14. A system according to claim 12, further comprising a safety system 1030 for detecting if an operator enters a predetermined area at the accessible side of the rotating table.

15. A system according to claim 12, wherein the rotating table is configured to be large enough that an operator cannot reach to the enclosed side.

* * * * *